United States Patent

[11] 3,588,124

[72] Inventor Paul Andre Guinard
 St. Cloud, France
[21] Appl. No. 784,089
[22] Filed Dec. 16, 1968
[45] Patented June 28, 1971
[73] Assignee Etablissements Pompes Guinard, Societe Anonyme
 Saint-Cloud, France
[32] Priority Dec. 18, 1967
[33] France
[31] 132668

[54] SEALING DEVICE FOR PUMPS AND OTHER SIMILAR MACHINES
 9 Claims, 1 Drawing Fig.
[52] U.S. Cl............................................... 277/3,
 277/15, 277/59
[51] Int. Cl........................................... E21b 33/00
[50] Field of Search............................................ 277/3, 15,
 27, 28, 59, 65

[56] References Cited
UNITED STATES PATENTS
3,360,272 12/1967 Blom et al...................... 277/3
3,179,422 4/1965 Phillips......................... 277/27X Primary Examiner—Carroll B. Dority, Jr.
Attorneys—Robert E. Burns and Emmanuel J. Lobato ABSTRACT: A sealing device for pumps, compressors and other similar machines which develop high pressures. The sealing device comprises at least a normally operative packing and standby normally inoperative packing which becomes operative when the normally operative packing fails. The standby packing is fitted upstream of the normally operative packing and is automatically rendered operative by a displaceable plunger device which is responsive to fluid pressure prevailing in a chamber supplied with leakage fluid recovered at the outlet side of the downstream normally operative packing when the normally operative packing becomes defective.

PATENTED JUN28 1971  3,588,124
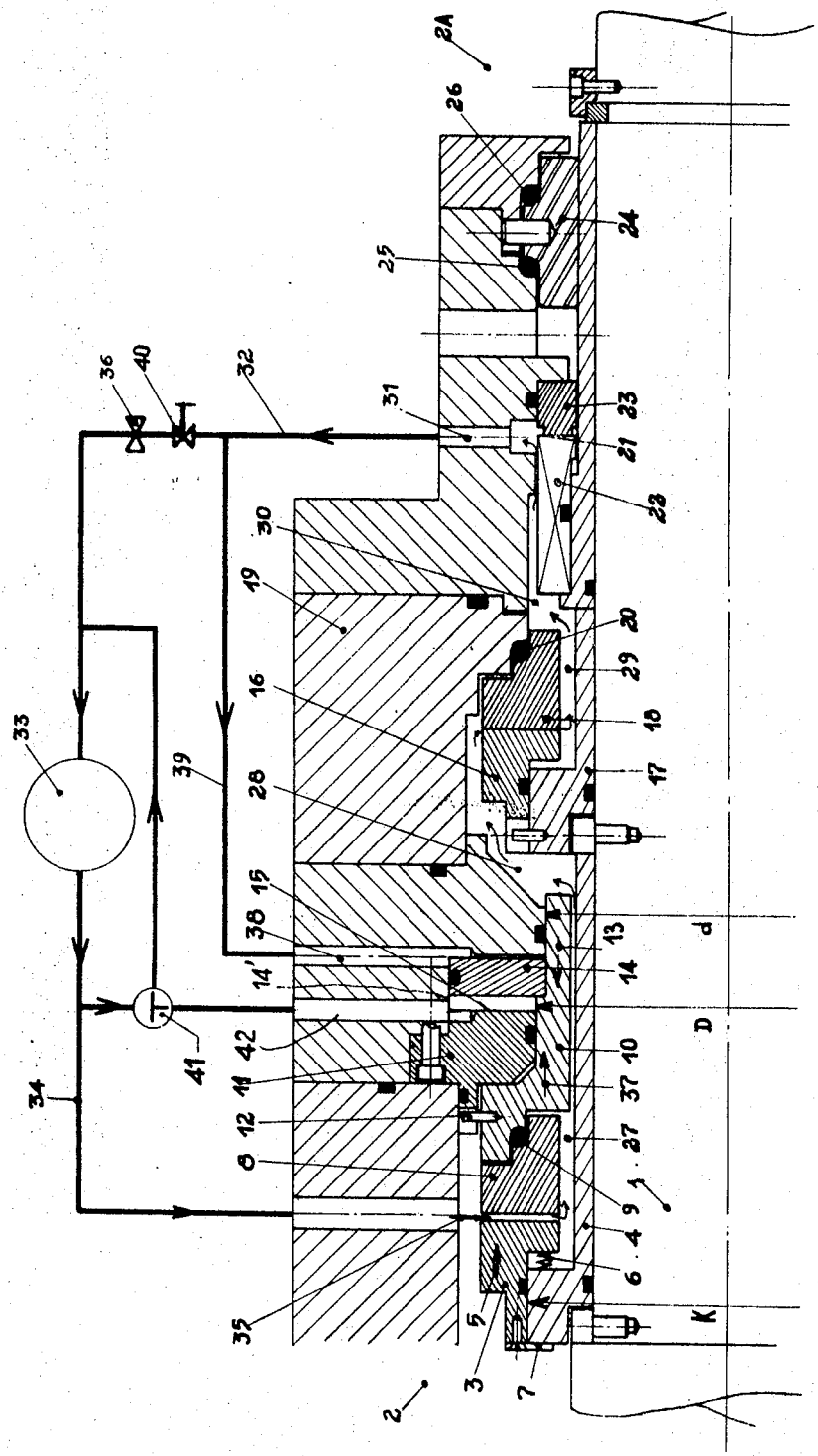

SEALING DEVICE FOR PUMPS AND OTHER SIMILAR MACHINES

BACKGROUND OF THE INVENTION

This invention relates to a sealing device for pumps, compressors and other similar machines developing high pressures, which comprises two mechanical packings, each consisting of one rotating and one stationary bush, mounted in series on the machine shaft. Such devices are already known, in which the "upstream" or pumpside packing constitutes the normal packing which is normally operative, while the second packing, fitted "downstream," that is to say nearer to the end where the shaft emerges from the machine casing, forms a standby packing, which is brought into service either by a hand control or automatically when the normal pumpside packing is not in a fit state to ensure a good seal, because of wear, deformation due to heat stresses or the entry of a foreign body between its two bushes. For this purpose, one of the bushes of the standby packing, which is normally held away from the other packing by a spring, is provided with a plunger that can be operated by pressure in a hydraulic circuit fed by the pump delivery and brought into action by the excessive leakage flow from the packing normally in service—with the aid, for example, of an overflow tank that collects the leakage from that packing and, when occasion arises, operates valves fitted in the said hydraulic control circuit.

One drawback of this arrangement, apart from its complicated design, is that the standby packing, once brought into action, remains in service until the machine is stopped and is therefore subjected to wear. Now the breakdown of the normal packing may be only temporary and the deformation of the bushes may automatically correct itself by the wearing in of the surfaces in contact, just as a foreign body or other fouling agent that has found its way between the bushes may be eliminated within a fairly short time. In that case, both packings will be serviceable again and the standby packing will suffer needless wear.

BRIEF SUMMARY OF INVENTION

The object of the present invention is a sealing device which likewise comprises two mechanical packings in series, but in which the restoration of the packing that normally provides the seal for the machine automatically puts the standby packing out of action. This device is characterized by the fact that the standby packing is fitted upstream of the normal packing and consists of one rotating and one nonrotating bush, so mounted that both are capable of axial translational motion, the rotating bush incorporating some means capable of elastic deformation opposed to its axial displacement, while the nonrotating bush is rigidly associated with a plunger exposed to the pressure prevailing in a chamber fed directly by at least part of the leakage recovered at the outlet side of the downstream packing.

The leakage is recovered from the outlet side of the downstream packing by a return pipe, the other end of which opens into the chamber of the plunger fixed to the nonrotating bush of the upstream packing, the pressure of the liquid in this circuit being regulated, for a predetermined maximum leakage, by a constriction provided in a pipe leading off the pipe already mentioned.

A control valve in series with this constriction is fitted in the pipe leading off the leakage return pipe, the closing of this valve enabling the upstream packing to be brought manually into action.

The intake side of a leakage return pump is connected to the pipe containing the constriction, while the delivery side of the pump is connected by a further pipe to the high-pressure side of the machine.

The delivery side of the leakage return pump is connected to that side of the plunger fixed to the nonrotating bush of the upstream packing which is not directly exposed to the leakage pressure from the downstream packing, this connection being made by a pipe in which a tap is fitted, the opening of which enable the upstream packing to be put out of action by manual control.

In one form of the invention, a third, low-pressure, mechanical packing is fitted so as to follow the downstream packing, beyond the point from which the leakage is drawn off by the circuit controlling the upstream packing, and a floating bearing is mounted on the machine shaft at the end of the machine casing with the aid of toroidal elastic packings.

The construction of the sealing device here proposed incorporates, for the standby or upstream packing, a sleeve fixed so as to turn with the shaft of the machine and carrying at its upstream end a shoulder on which the rotating bush is mounted with freedom to slide and against which this bush bears through the agency of one or more springs, while the nonrotating bush acting in conjunction with the said rotating bush is fitted with freedom to oscillate transversely within an interior shouldering on the end of a sleevepiece concentric with the shaft, which can slide within a fixed annular member that acts as a stop for a plunger held against an external shoulder on the said sleevepiece and capable of movement within a cylindrical chamber formed in the machine casing, the downstream end of the sleevepiece extending into a space containing the downstream packing, the outside diameter of the said end of the sleevepiece being smaller than the diameter of the shoulder against which the plunger is held.

Other features also included in the scope of the invention will become apparent from the following description of one possible form of sealing device conforming to the invention, in conjunction with the accompanying single drawing, given by way of example only and showing a portion of the device in section.

The device illustrated is fitted to a very-high-pressure pump intended to be used for pumping liquids that are dangerous for example, by reason of radioactivity. The pump shaft is numbered 1, the interior of the pump 2 and the outer or downstream connection side 2A.

The upstream packing, that is to say the one which lies towards the pump, is a standby packing and comprises a rotating bush 3 mounted on a sleeve 4 fixed to the shaft 1 for rotation therewith. This bush 3 is normally subjected to thrust in the direction of the arrow 5 by springs 6 so that it bears, through a small collar attached to it at 7, against one end of the sleeve 4. This upstream packing also incorporates a second bush 8, mounted in the conventional way, with a packing interposed at 9, on a supporting sleevepiece 10 concentric with the sleeve 4, so as to be able to move slightly and to permit the correct application to each other of the sealing surfaces of this rotating packing when in operation. According to one feature of the invention, the sleevepiece 10 has freedom of translational movement within a stationary annular member 11, but is held against rotation at 12. Thus, the bush 8 can be caused to carry out translational movement, so as to come to bear, when this upstream-rotating packing is brought into action, against its corresponding rotating bush 3, which is then thrust back a trifle in opposition to the springs 6. The movement indicated, in the direction of the arrow 13, is limited, however, by a plunger or piston 14, mounted on the sleevepiece 10 so as to slide within a bore 14′, formed in the pump casing and to come up against the face 15 of the fixed member 11, as will be described later.

A second mechanical packing is provided downstream of the standby packing and comprises a rotating bush 16 mounted on a sleeve 17 carried on the shaft 1, and a fixed bush 18, mounted on a fixed support 19, by conventional means, packing 20 permitting slight oscillation of this fixed bush 18. A third packing, to withstand low pressures, is provided at 21; this packing 21 may be of the gasket type or may be mechanical and incorporate a rotating bush 22 and a fixed bush 23 as shown. The staunchness of the seal may be further enhanced by the use of a floating ring or bearing 24, mounted between toroidal elastic packings 25 and 26 as illustrated.

The mode of operation of the sealing device described above is as follows:

When the pump is started, the various members of the packings occupy the positions shown in the drawing. Only the rotating packing 16—18 fitted downstream is in action, since the bushes 3 and 8 of the upstream packing are held apart and allow the passage of the liquid which is circulating at very high pressure at 2 in the interior of the pump. This high pressure then extends to spaces 27 and 28 and acts on the normally operative downstream packing, which should normally allow the passage of only a slight leakage, just necessary for its proper functioning. This downstream leakage which occurs at 29 may, but need not necessarily, escape by way of spaces and passages 30, 31 and 32, to a recovery pump 33, which returns it by way of a pipe 34 to the pump at 35. To keep this downstream leakage at a given pressure, a diaphragm or constriction 36, is provided in the leakage return circuit. So long as the leakage flow does not exceed a given value, giving rise to a given pressure, the various parts remain in the position shown. This is because, owing to the difference between the diameters D and $d$, D being greater than $d$, the pressure prevailing at 27 has a greater effect than the pressure prevailing at 28, and a resultant thrust is applied to the sleevepiece 10 in the direction of the arrow 37.

The low pressure of the downstream leakage, which acts at 38 on the plunger 14 by way of the pipes 32 and 39 is insufficient to move the assembly 8–10–14 in the direction of the arrow 13.

In the event of partial deterioration of the sealing surfaces of the bushes 16 and 18 in the downstream packing, the rate of flow of the downstream leakage is increased, as is also, therefore, the pressure produced thereby. In that case, this increased pressure, acting as already stated on the plunger 14 through the passage 38, moves the assembly formed by the sleevepiece 10 and bush 8 in the direction of the arrow 13, to bring the sealing surfaces of the bushes 8 and 3 into contact, the bush 3 being thrust slightly back, in opposition to the action of the springs 6, to a position determined by the plunger 14 coming up against the face 15. This movement and hence the maintenance of this upstream packing in the correct operative position are ensured by reason of the fact that the diameter K is greater than the diameter D.

The packing downstream may be put out of action only momentarily, as in the case, for instance, of sudden heating or the entry of a foreign body between the two bushes, so that this packing regains its initial staunchness after a time. In that case, the pressure transmitted via 32, 39 and 38 to the plunger 14 will drop, while the pressure between the two bushes 3 and 8 will rise and will then act on the sleevepiece member 10 so as to move it, along with its bush 8, in the direction of the arrow 37, because of the difference between the cross-sectional areas at D and $d$. This upstream packing 3—8 will thereupon be put out of action once more.

It will be noted that the action described so far is completely automatic and is controlled by the level of the downstream leakage pressure, which is governed by the rate of leakage.

Alternatively, for certain technical control reasons, either of the high-pressure packings may be put into or out of action manually with the aid of a set of valves, 40 and 41. For this purpose, while the rate of leakage from the downstream packing 16—18 remains the same, the closing of the valve 40 enables the pressure of that leakage to be increased and force to be exerted consequently on the plunger 14, as already described. The three-way cock 41 provides for the return whereby the upstream packing is put out of action, by diverting part of the delivery from the leakage return pump 35 into the pipe 42, which opens within the casing between the fixed member 11 and the plunger 15, which is then thrust to the right, into its position of rest.

It should be emphasized that the specific design described above and illustrated in the drawing is here given by way of example only. In general terms, all modifications or variants thereof which do not in any way alter the main features set out in the foregoing or the purpose thereof lie within the scope of the invention.

I claim:

1. A sealing device for pumps and compressors comprising a normally inoperative mechanical standby packing in series with a normally operative packing, both packings comprising a rotating bush and a nonrotating bush and hydraulic means operable to bring the standby packing into operation in the event of deterioration of the normally operative packing; characterized in that the standby packing is disposed on the upstream side of the normally operative packing with its rotating and nonrotating bushes mounted so that both are capable of axial translational motion, elastically deformable means is provided to oppose axial displacement of the rotating bush of the standby packing and a displaceable plunger device is operatively associated with the nonrotatable bush of the standby packing and is exposed to the pressure prevailing in a chamber supplied with at least a part of the leakage fluid recovered at the outlet side of the downstream normally operative packing.

2. A device according to claim 1 in which a return pipe places the outlet side of the downstream normally operative packing in communication with the plunger to apply a pressure to the plunger device which is a function of the fluid leakage past the downstream packing and a passage leading off the return pipe is provided with a constriction to regulate the pressure applied to the plunger device.

3. A device according to claim 2 in which a control valve is provided in series with the constriction in the passage leading off the return pipe to enable the upstream packing to be rendered operative by manual control of the control valve.

4. A device according to claim 2 in which a leakage return pump is connected between the passage leading off the return pipe and the high-pressure side of the device.

5. A device according to claim 4 in which the delivery side of the leakage return pump is placed in communication with the plunger device to apply a fluid pressure thereto in opposition to that applied by the return pipe and a further valve is provided to control such applied opposing fluid pressure whereby the opening of said further valve renders said upstream packing inoperative.

6. A device according to claim 1 including a third low-pressure mechanical packing disposed downstream of the outlet side of the normally operative packing.

7. A device according to claim 6 including a floating bearing mounted on toroidal elastic packing rings downstream of the third packing.

8. A device according to claim 1 including a sleeve carried on a shaft of the pump or compressor for rotation therewith the rotating bush of the upstream packing being slidably carried on the sleeve towards the upstream end thereof, a shoulder formed on the sleeve to limit axial displacement of the rotating bush of the upstream packing under the influence of the elastically deformable means, a fixed annular member, a sleevepiece mounted concentrically of the shaft and slidable within the fixed annular member, a shoulder formed on the sleevepiece for engagement by the plunger device to displace the sleevepiece in the sense to render the standby packing operative, the fixed annular member limiting displacement of the plunger device, the downstream end of the sleevepiece extending into a space containing the downstream packing, the outside diameter of the downstream end of the sleevepiece being smaller than the diameter of the shoulder engageably by the plunger device and the nonrotating bush of the standby packing being fitted with a freedom to oscillate in an interior shouldering formed in the upstream end of the sleevepiece.

9. In an apparatus for displacing liquid under pressure by rotating means including a rotatable shaft, sealing means for said shaft comprising a normally inoperative standby packing surrounding the shaft, a normally operative packing surrounding the shaft downstream of the standby packing, both packings each having a rotating bush and a nonrotating bush surrounding the shaft, a displaceable plunger device mounted for displacement between limits and operatively associated with the nonrotatable bush of the standby packing, fixed stop means defining said limits, means placing the plunger device in communication with the leakage liquid at the outlet end of the normally operative packing to produce a corresponding pressure which is operative to displace the plunger device and the nonrotatable bush of the standby packing when the pressure so produced exceeds a predetermined value to bring the standby packing into operation.